March 2, 1971  N. IOSIPESCU ET AL  3,566,681
METHOD AND APPARATUS FOR PURE SHEAR TESTING
OF ROCKS AND OTHER BUILDING MATERIALS
Filed Dec. 20, 1968  3 Sheets-Sheet 1

Nicolaie Iosipescu
Radu Matak
Inventors.

By Karl J. Ross
Attorney

Nicolaie Iosipescu
Radu Matak
Inventors.

By

United States Patent Office 3,566,681
Patented Mar. 2, 1971

3,566,681
METHOD AND APPARATUS FOR PURE SHEAR TESTING OF ROCKS AND OTHER BUILDING MATERIALS
Nicolaie Iosipescu and Radu Matak, Bucharest, Rumania, assignors to Incerc Institutul de Cercetari in Constructii si Economia Constructilor, Bucharest, Rumania
Filed Dec. 20, 1968, Ser. No. 785,692
Int. Cl. G01n 3/24
U.S. Cl. 73—101                                11 Claims

ABSTRACT OF THE DISCLOSURE

A shear-testing system for specimens of rock, mineral and man-made construction materials, e.g. concrete, in which the fracture is caused solely by pure shear. The specimen is a rectangular parallelopiped which is formed with a pair of right-angled notches at opposite parallel longitudinal sides of the body to a depth of one quarter of the height between these faces and is provided along its lateral faces with a pair of channels bridging the notches and of a depth of one-third the thickness of the body, thereby forming a central shear section in a median plane of the body through the vertices of the right-angled notches. The specimen is clamped between a pair of relatively movable shear members of C-shaped configuration which are inversely positioned and have pressure pieces disposed relatively close to the notch on one side of the specimen and relatively close to the end of the body remote from the notch on the other side. The pressure members of each shear yoke or member which are proximal and distal from the notches, respectively, are located on opposite sides of the body and shear is generated by compressive or tractive stress applied to these members.

---

Our present invention relates to the shear testing of rocks and other mineral matter in which the shear strength of the body is of interest. More particularly, the invention relates to a method or procedure for the single-shear or pure-shear testing of rocks, mineral bodies, man-made or artificial building materials, e.g. concrete or mortar, to a shear-testing device using this method or process, and to a specimen structure adapted to be used with this device.

The term "single-shear testing" and the expression "pure-shear" are used hereinafter to refer to the stressing of a specimen body, in a manner set out in detail, wherein the net force applied at a predetermined shear section in any direction other than the plane of this section is null or balanced so that substantially no transverse torsional, tensile or compressive stress contributes to the fracture of the shear section.

It has already been recognized that shear testing of mineral materials, e.g. naturally occurring rock or other mineral bodies and synthetic stone or hardenable building materials, is a convenient technique for ascertaining critical physical properties of these materials. It has already been proposed to test the shear strength of such materials by stressing specimens thereof, the shear strength being a measure of the stress applied to the body in units of force to the point at which fracture occurs along a shear section, divided by the area of this section, at the final break. The specimen may be weakened so as to establish this break section or at least to attempt to predetermine the same.

The determination of the pure-shear failure strength of mineral bodies, such as hardened construction materials and natural, geological structures, is desirable in order to ascertain the critical, mechanical characteristics of these materials from which it is possible to determine the resistance of geological massifs, to establish the carrying strength of the supporting posts of the pillars or voids left in subterranean structures such as mines (especially salt mines and the like), to calculate the load-carrying capabilities of natural or artificial building materials which may be prefabricated or cast in place, especially construction stones, bricks, mortar, cellular concrete and the like, and to evaluate the stresses produced by seismic action on structures of load-bearing masonry.

As has already been noted, numerous prior-art systems have been used heretofore for the determination of the shear strength of rocks, other mineral bodies and construction materials. In one of these systems, a specimen bar is engaged on two opposing parallel faces in opposite directions by steel-cutting members which generate shear in a section lying between these members and parallel to the direction in which they are urged against the body. This system has the disadvantage that pure-shear stress is not generated inasmuch as each blade acts as a fulcrum which creates normal stresses, i.e. stresses perpendicular to the shear plane, in the region between the shear blades. Examination has shown that the specimen is often torn apart by these normal stresses, or primarily by such normal stresses with only a minor contribution from the shear forces. The same disadvantage also characterizes an earlier system in which a pair of parallel shear sections is formed in the specimen which is loaded to failure. The loading force is applied between the shear section while a pair of blades supports the specimen against the loading force. The shear section is located between each anvil blade and the loading blade which still tend to generate the normal forces mentioned earlier.

In a different arrangement, the specimen has been loaded torsionally and is a cylindrical or prismatic body. The theoretical torsion formulae to breakage are used to calculate a pure-shear strength at the point to which fracture occurs. However, the torsion formulae are derived from the strength-of-material evaluations in the elastic loading range and are not conveniently translatable for the plastic-deformation range. This latter system involves the additional difficulty that mineral materials, especially rocks and construction materials, are often brittle so that the torsion break occurs in a helical pattern. Analysis has shown that this helical break is a result of normal tensile stress at directions of, say, 45° to the desired cross section so that the contribution of pure-shear is little, if any. When prismatic bodies are used, the torsional formulae fail entirely.

Finally, mention may be made of a testing system for mortar and the like wherein three bricks are bonded together by mortar in an offset relationship, the assembly being placed in the testing machine so that free ends of two lateral bricks rest on the lower head place while the other brick is subjected at its free end to the compressible action of the upper head plate. A disadvantage of this system is that the mortar frequently crumbles before a satisfactory evaluation is achieved, and breakage occurs unpredictably.

It is the principal object of the present invention to provide an improved shear-testing system in which the aforedescribed disadvantages can be obviated and an accurate reproducible determination of the shear strength of bodies of different types can be obtained in a time-saving economical manner.

A further object of this invention, of equal significance, is the provision of a system which will evaluate the pure-shear strength of a specimen, thereby negating the effect of normal forces which have heretofore dominated shear-testing procedures.

Another object of this invention is the provision of an improved apparatus of relatively simple construction for the pure-shear testing of rock or other mineral bodies as previously described.

Still further, an object of the present invention is the provision of an improved specimen structure for pure-shear testing by the process of this invention.

We have found that it is possible to overcome the aforedescribed disadvantages and accomplish the pure-shear testing of mineral materials when the specimen is, according to an important aspect of the invention, constituted as a rectangular parallelopiped having a pair of principal surfaces parallel to one another on opposite sides of the body, and a pair of mutually parallel secondary surfaces adjoining the primary surfaces at right angles; the specimen body of the present invention is formed with a precisely determined shear cross section in a median plane of the body perpendicular to both pairs of surfaces, a pure-shear action being sustained in this section. Basically, the primary surfaces are formed with right-angled notches to a depth of substantially one quarter of the height of the body between the primary surfaces, with the flanks of the notches extending symmetrically at angles of 45° to the aforementioned median plane. As a consequence of these notches, the shear section between the vertices of the notches has a height equal to half the height of the body. In addition, the shear section of the specimen, according to the present invention, is defined between a pair of channels formed in the secondary surfaces of the body, preferably to a depth of about one-third the thickness or breadth of the body whereby the shear section between these channels has a thickness or breadth of one-third of the overall thickness.

According to another aspect of this invention, the body is stressed by a pair of C-shaped stressing members, which can also be described as U-shaped calipers or yokes. The stressing member have bight portions extending around the ends of the parallelopiped remote from the pure-shear-section plane and each engages the primary surfaces at first and second locations which are relatively distal from the shear section and relatively proximal to the shear section, respectively. The shear members, however, act inversely upon the specimen body so that the first engagement location of one shear member is located at one of the principal surfaces while the first location of the other shear member, caliper or yoke is located on the opposite side of the shear plane and along the other principal surface. The corresponding locations of the calipers may be referred to as disposed on alternate sides of the shear plane. The shear stress, which may either be compressible or tractive, is applied across these shear members.

It has been found that this relationship assures a pure-shear stressing of the body in the precisely determined cross section with practically uniform contribution of the incremental stress in this section without any concentrated stressing in the elastic range and even up to the point of failure; as a consequence, any tendency to fracture the specimen in one place prior to fracture in another is obviated. When the specimen is composed of a synthetic material, e.g. concrete or mortar which is hardenable, we may cast the body in a mold of suitable configuration such that, upon removal from the mold, the specimen is formed with the aforedescribed channels and notches. When this procedure is used, the channels, instead of having their preferably rectangular section, may be provided with a slight draft, i.e. may have flanks diverging slightly outwardly. When, of course, naturally hard bodies are used or the specimen has already hardened or been driven from their hardened body, we cut the notches and channels in the body by any conventional mineral-cutting technique, e.g. with the aid of diamond saws, rotary milling cutters or the like.

The above and other objects, features and advantages of the present invention will become more readily apparent from the following description, reference being made to the accompanying drawing in which.

Figure 1:
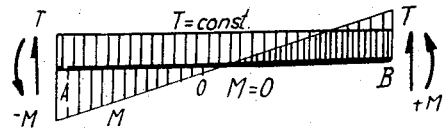
FIG. 1 is a moment diagram facilitating the explanation of the relationship between the bending moment and the shearing force upon which the principles of the present method are based.
Figure 2:
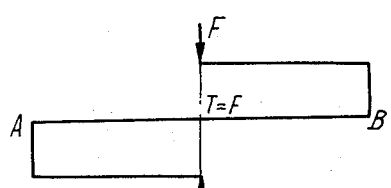
FIG. 2 is a force diagram showing how the desired balance of forces is achieved.

Referring initially to FIG. 1, wherein the shear diagram is superimposed on the moment diagram of a specimen to be subjected to a shearing test, it may be pointed out that the process of the present invention contemplates loading the specimen with pure-shear force which can be represented by $T \neq 0$ operating in the zero-moment section ($M=0$) of an elongated rectangular specimen loaded to break with a linear variation of the bending moment through the bending range, i.e. with a shear force of constant value on this entire central portion and a zero-moment point (0) located at the geometrical center of the length of the body. A simple shearing force is thus developed without any normal stresses in that section (FIG. 2) corresponding to $T=F$ and $M=0$. F, of course, is the applied shearing force produced, for example, by a pair of caliper sections which are diagrammatically represented in FIG. 3.

In its simplified form, the apparatus of the present invention makes use of a specimen E which is formed with a pair of right-angled notches N' and N" in the principal longitudinal sides L' and L" of the specimen. About each end of the specimen, a respective caliper section $C_1$ and $C_2$ is provided in inversely symmetrical relationship about the shear plane P. The caliper $C_1$ has a first pressure member $Cp_1$ which bears upon one principal surface of the specimen E at a location close to the corresponding notch N" and relatively distal from the corresponding end of the specimen. The other pressure portion $Cp_1'$ is located remote from the corresponding notch N' and close to the corresponding end of the specimen. The caliper $C_2$ has pressure members $Cp_2$ and $Cp_2'$ which are equivalent. When a shear force F is applied using this loading device, components $F_1$ and $F_2$ are generated in the direction of the arrows at the pressure members $Cp_1$, $Cp_1'$ and $Cp_2$, $Cp_2'$.

Figure 3:
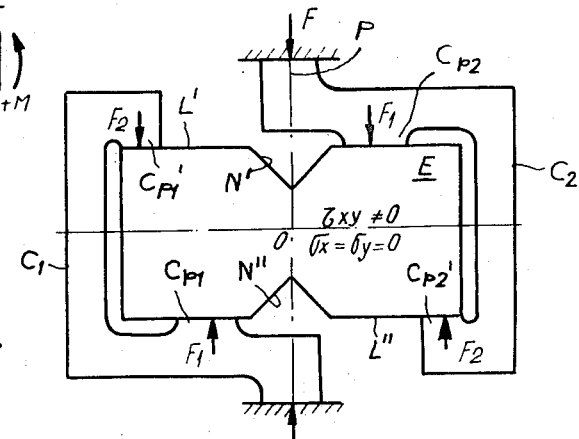
FIG. 3 is a diagram of a system for carrying out the present invention.
Figure 4:
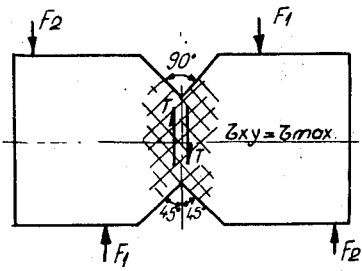
FIG. 4 is a front view of a specimen illustrating the manner in which shear stress is maximalized in the pure-shear section.
Figure 5:
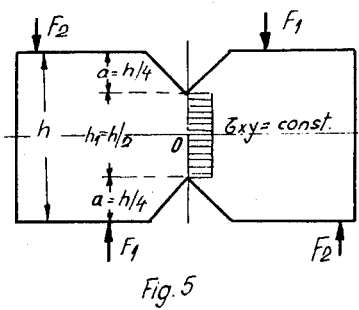
FIG. 5 is a diagram similar to FIG. 4 illustrating how the uniform distribution of the shear stress in the pure-shear section is achieved.

According to an essential feature of this invention, the specimen E receives a shape which, established by photoelastic investigations, makes it possible to obtain a maximum value for the shear stresses in the specified pure-shear section represented, for example, by the shear planes in FIG. 4. The shear stresses ($\tau$) are represented in FIGS. 3, 4 and 5 with respect to the notch section. From FIG. 3, it is apparent that, with a loading of the specimen by the calipers, $\tau_{xy} \neq 0$, and that $\sigma_x = \sigma_y = 0$. As represented in FIG. 4, the shear stress is a maximum value in the pure-shear section ($\tau_{xy} = \tau_{max}$) while FIG. 5 represents the uniform distribution of the shear stress in the pure-shear section ($\tau_{xy} = $ constant). When the specimen has additionally weakened with lateral channels to depths of about one-third of the weight of the specimen (FIG. 6A), break is always assured in the pure-shear section and $\tau_{yx}=\tau_y$.

Figure 6A:
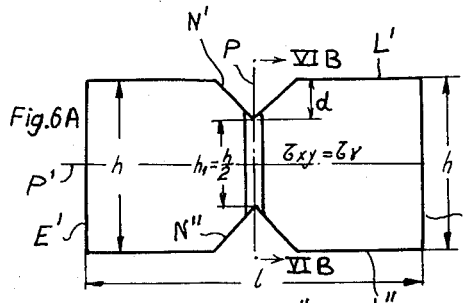
FIG. 6A is a similar view of a specimen provided with channels and notches according to the present invention.
Figure 6B:
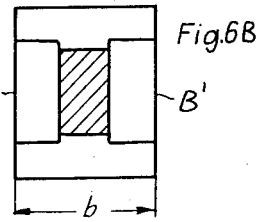
FIG. 6B is a cross section taken along the line VIB—VIB of FIG. 6A.
Figure 6C:
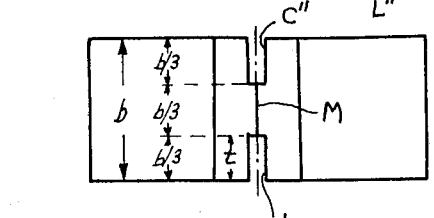
FIG. 6C is a plan view of the specimen of FIGS. 6A and 6B.

From the three FIGS. 6A, 6B and 6C, the configuration of a specimen adapted to be used with the stressing diagram illustrated in FIG. 3 will be apparent. Basically, the specimen is a rectangular parallelopiped having the principal longitudinal surfaces L' and L'' with a length $l$, a pair of broad faces B' and B'' with this length and a height $h$. The faces E' and E'' have heights $h$ and breadths represented at $b$ (FIGS. 6B and 6C).

The principal longitudinal faces L' and L'' are formed with notches N' and N'' to a depth perpendicular to the surfaces L' and L'', of substantially one quarter the height $h$ of the specimen. Consequently, $a=h/4$. Since the notches N' and N'' are symmetrical both about the shear-section plane P and the longitudinal median plane P', the resulting shear section (hatched in FIG. 6) is located precisely centrally of the specimen and has a height $h_1=h/2$. In addition, a pair of lateral channels C' and C'' are formed in the broad faces B' and B'' to a depth $t=b/3$. With a specimen construction of this type, the break is always insured in the pure-shear section or in its immediate vicinity.

Figure 7:
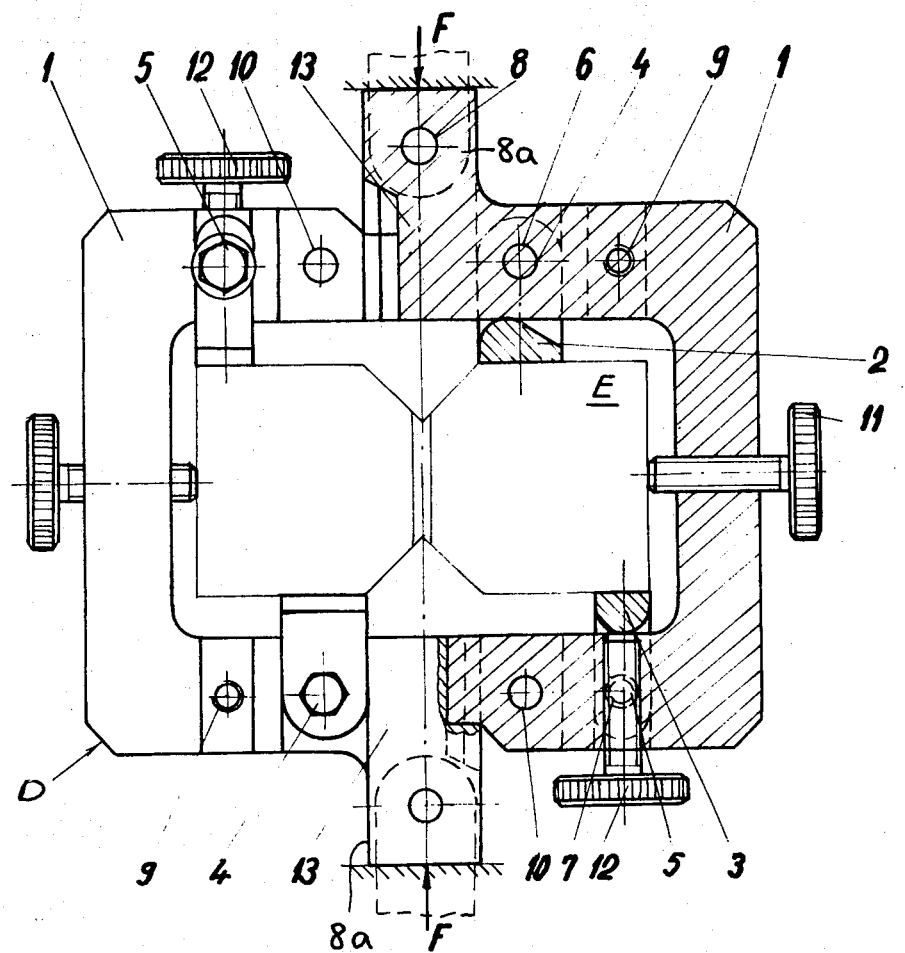
FIG. 7 is a side view, partly in longitudinal section of an appliance for carrying out the method of the present invention.

In FIG. 7, we show a unit which has been found to be highly successful for the shear-testing of such specimens in actual practice. The loading device, represented generally at D, provides a bending of the specimen to break with a linear variation of the bending moment M (FIG. 1) and a point of 0-moment corresponding to the center of the length of the specimen; the shearing force is a constant value along the central portion of this length (see FIG. 5).

The device D comprises a pair of steel calipers or yokes 1 of similar construction and of horseshoe configuration, the calipers being positioned in inverse symmetry about the respective ends of the specimen E. Each of the calipers is provided in corresponding positions with a pair of pressure members 2 and 3 acting upon the principal longitudinal surfaces of the specimen. The pressure members preferably are of U-shaped configuration so that their shanks or arms extend about and receive the calipers 1 with clearance and can be anchored with play by bolts 4 and 5 received in the holes 6 and 7 of the calipers.

The holes and pressure faces are disposed such that contact between the caliper and the pressure face is effective at a single point located at one-third of the length for pressure member 2 and half the length for pressure member 3.

The calipers or yokes 1 are also formed with holes 8 to which tension straps can be anchored so that tractive or tension loading can be accomplished as well as the compressive loading represented by the arrows F. When tension loading is used, the positions of the removable pressure members are interchanged, and to this end, apertures 9 and 10 are provided to accommodate the pressure members 2 and 3 respectively when tension loading is of interest. The lugs 8a may be relatively massive stubs which can be received between the head plates of a testing machine adapted to provide the compressive force F.

Milled head screws 12 are threaded into the calipers and hold the pressure members in place against the specimen. Between the two calipers, a slide joint of V-way or dovetail construction is provided to allow relative movement of the calipers in the direction represented by the arrows F.

Figure 8:
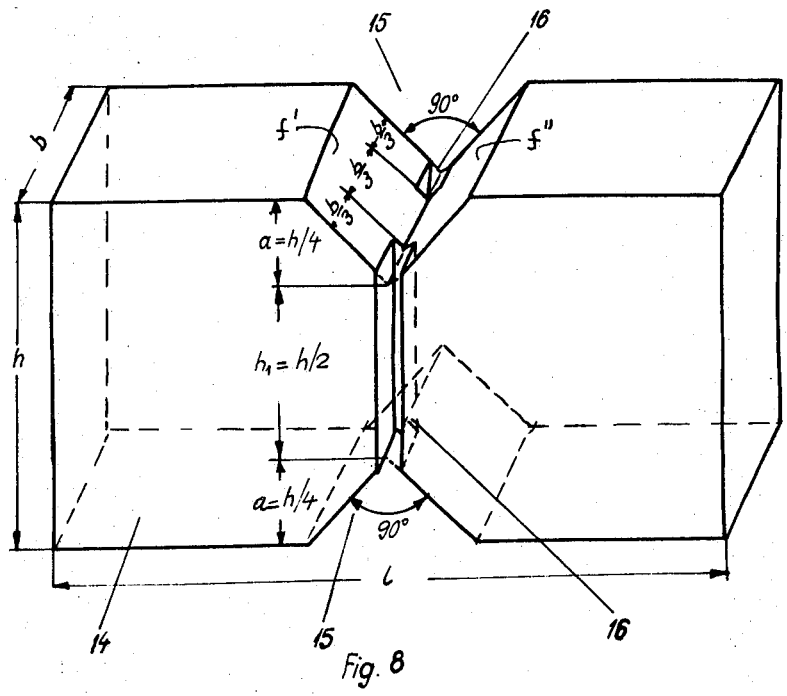
FIG. 8 is a perspective view of a specimen body formed from hardened material.

In FIG. 8, a specimen of the type used for testing of rock samples is shown. In this specimen, the flanks $f'$ and $f''$ of the notches 15 are milled or cut into the rectangular parallelopiped block with a milling cutter or diamond saw of conventional construction, the flanks extending at an angle of 45° to the surfaces of the block to include between them the right angle mentioned earlier. The notch depth $a$ is represented as $h/4$, as previously described, and the channels 16 are shown to have a rectangular cross section (see also FIG. 6C). When, however, the specimen is to be cast from a construction material such as concrete or mortar, the lateral channels 17 may have flanks 17' and 17'' which diverge slightly outwardly with a draft of about 20% (1:5). The latter arrangement enables removal of the mortar or other hardenable body from the mold. The specimen is introduced between the calipers and centered via a pair of milled-head screws 11 bearing on the ends of the body received in the bight portions of the calipers such that shear plane P is in the exact center of the stubs 8a of the calipers. Screws 12 then urge their pressure members 2, 3 into contact with the specimen. The assembly is then placed between the head plates of the testing machine.

With a conventional testing machine, compressive or tensile loading is produced until the specimen breaks under pure-shear stress at its minimum section corresponding to the bottom of the right-angled notches N', N'' and the bottoms of the rectangular or trapezoidal slots C', C''. The pure-shear strength of the material constituting the specimen is obtained by dividing the maximum or failure shearing force ($T_r=F_{max}$) read from the testing machine at the moment of break by the net area of the specimen at the point of breakage; for all practical purposes, breakage occurs at the minimum section previously mentioned with a surface area $S_f=h_1 \times b_1$. The pure-shear strength $$\tau_r = \frac{T_r}{S_f} = \frac{F_{max}}{h_1 \times b_1}$$

Figure 9:
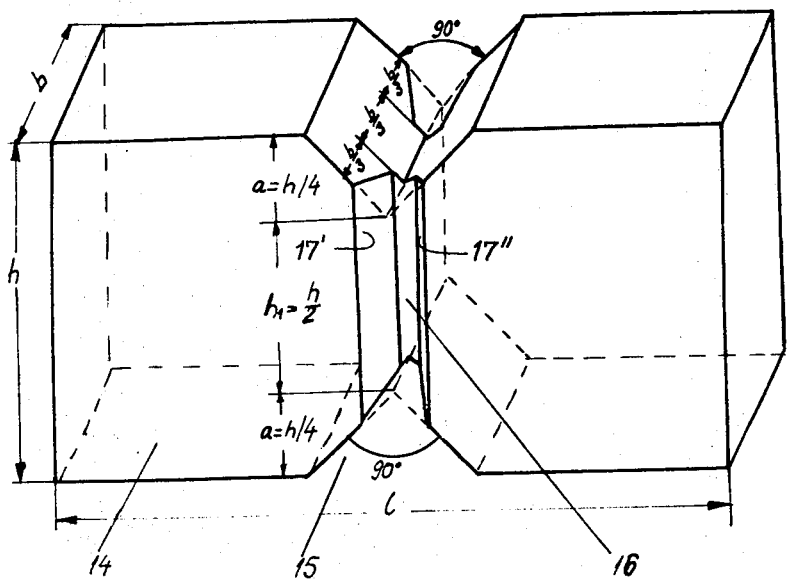
FIG. 9 is a perspective view of a specimen body formed from a hardenable material according to the present invention.

Using specimens having a length $l$ of 8 mm., a height $h$ of 40±0.05 mm. and a breadth $b$ of 30 mm., with a pure-shear section $S/f=2$ cm.$^2$, five specimens of natural and synthetic material were tested, the results being given below. The materials were riolithic breccia (Rosia Montana)—Example I, grey and blue rock salt (Tg Ocna)—Example II, fired brick—Example III, cellular concrete—Example IV, and cement mortar—Example V. The mortar was cast into a specimen as shown in FIG. 9 while the other minerals were milled to form the notches (FIG. 8).

The stressing members, which were made from steel plate, have a thickness of 20 mm. with a configuration as shown in FIG. 7. The arms of the C-shaped members were formed with channels of a depth of 1 mm. to receive the U-shaped pressure pieces 2 and 3, the contact surface of the former being 14 mm. in length and the contact surface of the latter being 10 mm. in length, both having a width of 13 mm. (corresponding to the breadth of the specimen). All the specimens broke at the pure-shear section on its immediate vicinity. Several tests were made in which the following results were obtained:

TABLE I

| Example | $T_r$ (kg.f.) | $\tau_r=T_r/S_f$ (kg.f./cm.$^2$) |
| --- | --- | --- |
| I (riolithic breccia) | 101 | 50.5 |
| II (rock salt) | 77.5 | 38.75 |
| III (brick) | 66 | 30 |
| IV (cellular concrete) | 10 | 5 |
| V (mortar) | 20.5 | 10.25 |

The improvement described and illustrated is believed to admit of many modifications within the ability of persons skilled in the art, all such modifications being considered within the spirit and scope of the invention except as limited by the appended claims.

We claim:
1. A process for the pure-shear testing of rocks, mortars and other synthetic or natural mineral materials, comprising the steps of:
   forming a rectangular specimen with the configuration of a rectangular parallelopiped provided with a pure-shear section lying generally in a median plane of the specimen perpendicular to its length, said speci- men having a pair of principal longitudinal sides spanning the length and breadth of the specimen, and a pair of secondary sides spanning the length and height of the specimen, said principal sides being formed with symmetrical notches having their vertices at said plane, said secondary sides being formed with symmetrical channels interconnecting said notches; and clamping ends of said speciment on opposite sides of said plane in respective shear members having pressure regions located relatively proximal to one of the notches and relatively distal from the other notch, the members being disposed inversely with respect to one another and applying force to said members substantially in said plane to break whereby the pure-shear strength of the specimen is equal to the applied force divided by the area of the pure-shear section defined between said notches and said channels in said plane.

2. The method defined in claim 1 wherein said notches are of right-angle cross section and extend to a depth $a$ equal to one quarter of the height $h$ of said specimen between said principal sides.

3. The method defined in claim 1 wherein said channels are of generally rectangular cross section and extend to a depth of substantially one-third the breadth $b$ of said specimen between said secondary sides.

4. The method defined in claim 1 wherein said channels have outwardly divergent flanks and extend to a depth of substantially one-third of the breadth $b$ of said specimen between said secondary sides.

5. The method defined in claim 1 wherein said notches have flanks each extending at an angle of 45° to said plane.

6. The method defined in claim 1 wherein said specimen is composed of a settable material and is formed with said notches and channels by casting.

7. The method defined in claim 1 wherein said specimen is composed of a hard body and said channels and notches are cut therein.

8. A system for the pure shear testing of rocks, mortars and synthetic or natural mineral materials, comprising a rectangular parallelopipedal body having a pair of principal longitudinal sides extending along the length $l$ and the breadth $b$ of said body and a pair of mutually parallel secondary sides extending along the length and height $h$ of said body, said principal sides being formed centrally of their length with a pair of symmetrical right-angled notches to a depth $a=h/4$, said secondary faces being formed with symmetrical channels connecting said notches to a depth $t=b/3$, and, in combination therewith, means for clamping the opposite longitudinal ends of said body and applying force thereto substantially in a plane of the roots of said notches and channels whereby the pure shear strength of said body is equal to the applied force divided by the area of the pure-shear section defined between said notches and said channels in said plane.

9. A device for the pure-shear testing of a rectangular parallelopipedal specimen, comprising a pair of relatively slidable interfitting shear members each having the configuration of a caliper and being engageable about a respective end of said specimen, a respective first pressure member interposed between each caliper and a principal longitudinal side of said specimen at a location relatively distal from the corresponding end thereof, and a second pressure member engageable with the opposite principal longitudinal side of said specimen and located relatively proximal to the corresponding end thereof; and means for applying equal and opposite forces to said calipers at locations lying in a common plane perpendicular to said principal sides and centered between the corresponding pressure members thereof and for constraining said calipers against rotation, said calipers having their pressure members located inversely with respect to one another.

10. The device defined in claim 9 wherein said calipers are provided with stubs extending away from said principal surfaces in said plane and are formed with means enabling removable attachment of the respective pressure members thereto, said device further comprising means for centering said specimen between said calipers, said pressure members being U-shaped and having arms adapted to receive the respective calipers.

11. The device defined in claim 10 further comprising means enabling the application of tension force to said shear members.

References Cited

UNITED STATES PATENTS 459,643  9/1891  Montgomery _____ 81—119

JERRY W. MYRACLE, Primary Examiner

U.S. Cl. X.R.

73—103